United States Patent Office 2,915,509
Patented Dec. 1, 1959

2,915,509

COPOLYMERS OF TRIFLUOROCHLORO-
ETHYLENE

Francis J. Honn, Westfield, N.J., and John M. Hoyt, Woodside, N.Y., assignors, by mesne assignments, to Minnesota Mining and Manufacturing Company, St. Paul, Minn., a corporation of Delaware No Drawing. Application June 25, 1956
Serial No. 593,383

10 Claims. (Cl. 260—87.5)

This invention relates to, and has for its object, the preparation of new and useful copolymers of trifluorochloroethylene. More particularly, the invention relates to, and has for its object, the preparation of thermoplastic copolymers of trifluorochloroethylene having a wide variety of commercial uses and applications. Still more particularly, the invention relates to, and has for its object, a method for the preparation of these copolymers. Other objects and advantages inherent in the invention will become apparent to those skilled in the art from the accompanying description and disclosure.

In accordance with the present invention, trifluorochloroethylene is copolymerized with a hexafluorobutene, for example, 2,3-dichlorohexafluorobutene-2 or 1,1,1,4,4,4-hexafluorobutene-2 to produce new and useful copolymeric compositions. In this respect, it is found that these copolymeric compositions possess increased resistance to oil and hydrocarbon fuels, improved flow-properties, and improved chemical and physical stability over any of the aforementioned comonomers alone. These copolymeric compositions of trifluorochloroethylene and the aforementioned hexafluorobutenes, constitute valuable macromolecules and are adaptable to a wide variety of commercial uses. They are particularly valuable, because of their selective solubility in various commercial solvents, in serving as durable, flexible, protective coatings on surfaces which are subjected to environmental conditions in which they may come into contact with any of the aforementioned corrosive substances.

In general, as more fully hereinafter disclosed, the copolymeric compositions of the present invention are produced from monomeric mixtures containing trifluorochloroethylene and the hexafluorobutene, as a comonomer, at temperatures between about —20° C. and about 150° C., with intermediate temperature ranges being selected with reference to the specific copolymer system employed. The most useful thermoplastic copolymeric compositions of the present invention are copolymers produced from monomeric mixtures containing between about 10 mole percent and about 90 mole percent of the trifluorochloroethylene and the remaining major constituent being the hexafluorobutene. The preferred copolymeric compositions of the present invention are copolymers produced from monomeric mixtures containing between about 25 mole percent and about 75 mole percent of the trifluorochloroethylene and the remaining major constituent being the hexafluorobutene. As previously indicated, preferred examples of the hexafluorobutene comonomer, copolymerized with the trifluorochloroethylene, are 2,3-dichlorohexafluorobutene-2 or 1,1,1,4,4,4-hexafluorobutene-2.

The polymeric compositions of the present invention are preferably prepared by carrying out the polymerization reaction in the presence of a free-radical-forming promoter. For this purpose, the polymerization reaction is carried out by employing a water-soluble peroxy type initiator in a water-suspension type recipe or an organic peroxide initiator in a bulk-type system. The water-suspension type recipe is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of a metallic salt of an aliphatic acid having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e.g., perfluorooctanoic acid) or perfluorochlorocarboxylic acid salts (e.g., trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents are present in an amount between about 0.5 and about 10 parts by weight per 100 parts of total monomers present.

The polymerization reaction is preferably conducted under alkaline conditions. It is desirable, therefore, that the pH be maintained between about 7 and 11 in order to prevent gelling of the resulting polymeric product, a condition which often causes slowdown or stoppage of the polymerization reaction. In this respect, it should be noted that it is sometimes necessary to maintain the pH of the system within the aforementioned pH limits by the addition of suitable buffer agents. Typical examples are sodium borate and disodium phosphate.

As indicated above, the polymerization reaction may also be carried out with the initiater being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, trichloroacetyl peroxide, 2,4-dichlorobenzoyl peroxide and dichlorofluoroacetyl peroxide, benzoyl peroxide and di-tertiary butyl peroxide.

As previously indicated, the polymerization reaction is carried out, in general, at a temperature between about —20° C. and about 150° C. When the polymerization reaction is carried out employing a water-suspension type recipe, temperatures between about 5° C. and about 100° C. are preferably employed. When the polymerization reaction is carried out in the presence of an organic peroxide initiator in a bulk-type polymerization system, temperatures over the entire range of between about —20° C. and about 150° C. are preferably employed depending upon the decomposition temperature of the promoter. The polymerization reactions described herein to produce the polymeric compositions of the present invention are carried out under autogenous conditions of pressure.

As previously indicated, the polymerization compositions of the present invention are particularly suitable and useful when employed in the form of durable, flexible coatings on a wide variety of surfaces, and particularly on surfaces which are subjected to distortion in normal use, such as fabric surfaces. For this purpose, the polymeric composition may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting, unduly, the overall yield. Suitable polymerization modifiers include chloroform ($CHCl_3$), Freon-113 ($CF_2ClCFCl_2$), carbon tetrachloride ($CCl_4$), trichloroacetyl chlorine ($CCl_3COCl$), bromotrichlorometane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following examples are offered for a better understanding in producing the copolymeric compositions of the present invention and are not to be construed as limiting its scope.

*Example I*

A heavy-walled glass polymerization tube of about 300 ml. capacity was flushed with nitrogen and then charged with 20 ml. of a catalyst solution prepared by dissolving 2.5 grams of potassium persulfate in 100 ml. of water. This solution in the polymerization tube was then frozen. Thereafter, there was added to the polymerization tube 10 ml. of a solution prepared by dissolving 2 grams of sodium metabisulfate in 100 ml. of water. The contents of the tube were then refrozen. Thereafter, there were added to the frozen contents of the tube 10 ml. of a solution prepared by dissolving 0.5 gram of ferrous sulfate heptahydrate in 100 ml. of water. The contents of the tube were once more frozen. The tube was next connected to a gas-transfer system and evacuated at liquid nitrogen temperature. To the frozen contents of the tube were added, by distillation, 16 grams of trifluorochloroethylene and 33.4 grams of 2,3-dichlorohexafluorobutene12, which comprised a 50/50 molar ratio.

The 2,3-dichlorohexafluorobutene-2 is prepared according to the procedure described by Henne and Trott, Journal of the American Society, volume 69, page 1820 (1947).

The polymerization tube was next sealed under vacuum and agitated in a temperature-regulated water-bath at 20° C. for a period of 64 hours. At the end of this time, the contents of the tube were coagulated by freezing at liquid nitrogen temperature. The coagulated product was then removed from the tube, washed with hot water and then dried to constant weight in vacuo at 35° C. A thermoplastic copolymeric product was obtained which was found to comprise trifluorochloroethylene and 2,3-dichlorohexafluorobutene-2 in an amount of 4.5 grams. This amount corresponded to a 9% conversion.

*Example II*

Employing the procedure set forth in Example I and the same polymerization system, the tube was charged with 31.2 grams of trifluorochloroethylene and 18.8 grams of 2,3-dichlorohexafluorobutene-2, which comprised a 77/23 molar ratio. The polymerization reaction was carried out at a temperature of 20° C. for a period of 64 hours. The resultant product was worked-up in accordance with the same procedure as set forth in Example I. A thermoplastic copolymeric product was obtained which was found to comprise trifluorochloroethylene and 2,3-dichlorohexafluorobutene-2 in an amount of 21 grams. This amount corresponded to a 42% conversion.

*Example III*

Employing the procedure set forth in Example I, the same catalyst system was employed, except that ammonium persulfate was substituted for the potassium persulfate, in a similar amount of 2.5 grams. The polymerization tube was next charged with 20.8 grams of trifluorochloroethylene and 29.2 grams of cis-1,1,1,4,4,4-hexafluorobutene-2, which comprised a 50/50 molar ratio. The cis-1,1,1,4,4,4-hexafluorobutene-2 is prepared according to the procedure described by A. L. Henne and W. G. Finnegan, Journal of the American Chemical Society, volume 71, page 298 (1949).

The polymerization reaction was carried out at a temperature of 20° C. for a period of 23 hours. The resultant product was worked-up in accordance with the same procedure as set forth in Example I. A thermoplastic copolymeric product was obtained which was found to comprise trifluorochloroethylene and cis-1,1,1,4,4,4-hexafluorobutene-2 in an amount of 2 grams. This amount corresponded to a 4% conversion.

As previously indicated, the polymeric compositions of the present invention possess highly desirable physical and chemical properties which make them useful for application to various surfaces as protective coatings. When employed as protective coatings on any of the surfaces previously described, the raw copolymeric composition, such as is produced in accordance with the procedure set forth in the above examples, is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating composition, various vulcanizing agents. In the latter case, supplementary heat-treatment of the coating is required, either during the solvent-removal step or thereafter. After the solvent has been completely evaporated, the coated surface is ready for use. In this respect, it should be noted that the polymeric coating composition may be applied to the surface either as a single coating or, if so desired, the protective coating may be built-up by the application of several layers, each layer being permitted to harden by solvent evaporation before the next layer is applied. Furthermore, if so desired, the protective coatings, or the polymeric composition, when obtained in the form of sheets, may be suitably pigmented.

Other uses for the copolymeric compositions of the present invention reside as coatings in the fabrication of pressure-sensitive tape for electrical insulation purposes, or as adhesives for fastening a rubber surface to a metal or another rubber surface.

Since certain changes may be made in carrying out the process of the present invention in producing the desired polymeric compositions without departing from the scope of the invention, it is intended that all matter contained in the above description is to be interpreted as illustrative and not in a limiting sense.

We claim:

1. A process which comprises polymerizing a monomeric mixture of trifluorochloroethylene and a hexafluorobutene selected from the group consisting of 2,3-dichlorohexafluorobutene-2 and 1,1,1,4,4,4-hexafluorobutene-2, said mixture containing between about 10 mole percent and about 90 mole percent trifluorochloroethylene and the remaining major constituent being the hexafluorobutene, in the presence of a free-radical-forming polymerization promoter at a temperature between about −20° C. and about 150° C.

2. A process which comprises polymerizing a monomeric mixture consisting essentially of trifluorochloroethylene and a hexafluorobutene selected from the group consisting of 2,3-dichlorohexafluorobutene-2 and 1,1,1,4,4,4-hexafluorobutene-2, said mixture containing between about 25 mole percent and about 75 mole percent trifluorochloroethylene in the presence of a free-radical-forming polymerization promoter at a temperature between about −20° C. and about 150° C.

3. A process which comprises polymerizing a monomeric mixture consisting essentially of trifluorochloroethylene and 2,3-dichlorohexafluorobutene-2, said mixture containing between about 10 mole percent and about 90 mole percent trifluorochloroethylene in the presence of a free-radical-forming polymerization promoter at a temperature between about −20° C. and about 150° C.

4. A process which comprises polymerizing a monomeric mixture consisting essentially of trifluorochloroethylene and 1,1,1,4,4,4-hexafluorobutene-2, said mixture containing between about 10 mole percent and about 90 mole percent trifluorochloroethylene, in the presence of a free-radical-forming polymerization promoter at a temperature between about −20° C. and about 150° C.

5. A process which comprises polymerizing a monomeric mixture consisting essentially of trifluorochloroethylene and 2,3-dichlorohexafluorobutene-2, said mixture containing between about 25 mole percent and about 75 mole percent trifluorochloroethylene, in the presence of a free-radical-forming polymerization promoter at a temperature between about −20° C. and about 150° C.

6. A process which comprises polymerizing a monomeric mixture consisting essentially of trifluorochloroethylene and 1,1,1,4,4,4-hexafluorobutene-2, said mixture containing between about 25 mole percent and about 75 mole percent trifluorochloroethylene, in the presence of a free-radical-forming polymerization promoter at a temperature between about −20° C. and about 150° C.

7. A copolymer consisting essentially of monomer units corresponding to trifluorochloroethylene and a hexafluorobutene selected from the group consisting of 2,3-dichlorohexafluorobutene-2 and 1,1,1,4,4,4-hexafluorobutene-2 containing between about 10 mole percent and about 90 mole percent of trifluorochloroethylene.

8. A copolymer consisting essentially of monomer units corresponding to trifluorochloroethylene and 2,3-dichlorohexafluorobutene-2 containing between about 25 mole percent and about 75 mole percent of trifluorochloroethylene.

9. A copolymer consisting essentially of monomer units corresponding to trifluorochloroethylene and 1,1,1,4,4,4-hexafluorobutene-2 containing between about 25 mole percent and about 75 mole percent of trifluorochloroethylene.

10. A process which comprises polymerizing a water-suspension system a monomeric mixture consisting essentially of trifluorochloroethylene and a hexafluorobutene selected from the group consisting of 2,3-dichlorohexafluorobutene-2 and 1,1,1,4,4,4-hexafluorobutene-2, said mixture containing between about 10 mole percent and about 90 mole percent trifluorochloroethylene, in the presence of a free-radical-forming polymerization promoter at a pH of between about 7 and 11 at a temperature between about 5° C. and about 100° C.

References Cited in the file of this patent

UNITED STATES PATENTS

| | | |
|---|---|---|
| 2,684,959 | Rearick | July 27, 1954 |
| 2,705,706 | Dittman et al. | Apr. 5, 1955 |
| 2,774,109 | Kaufman | Dec. 18, 1956 |
| 2,774,751 | Passino et al. | Dec. 18, 1956 |

UNITED STATES PATENT OFFICE
CERTIFICATE OF CORRECTION

Patent No. 2,915,509                                                December 1, 1959

Francis J. Honn et al.

It is hereby certified that error appears in the printed specification of the above numbered patent requiring correction and that the said Letters Patent should read as corrected below.

Column 3, line 40, for "chlorine" read -- chloride --; line 41, for "metane" read -- methane --; line 60, for "metabisulfate" read -- metabisulfite --; same column 3, line 70, for "chlorohexafluorobutene12," read -- chlorohexafluorobutene-2, --.

Signed and sealed this 10th day of May 1960.

(SEAL)
Attest:

KARL H. AXLINE                                         ROBERT C. WATSON
Attesting Officer                                     Commissioner of Patents